Sept. 26, 1961 W. ENGEL 3,001,491
CONTROL MEANS FOR ZIG-ZAG SEWING MACHINE HAVING
AUTOMATICALLY DISCONNECTABLE CONTROL MECHANISM
Filed Jan. 18, 1956 6 Sheets-Sheet 3

Inventor:
WOLFGANG ENGEL
Warren F.B. Lindsley
ATTORNEY

Inventor:
WOLFGANG ENGEL

ATTORNEY

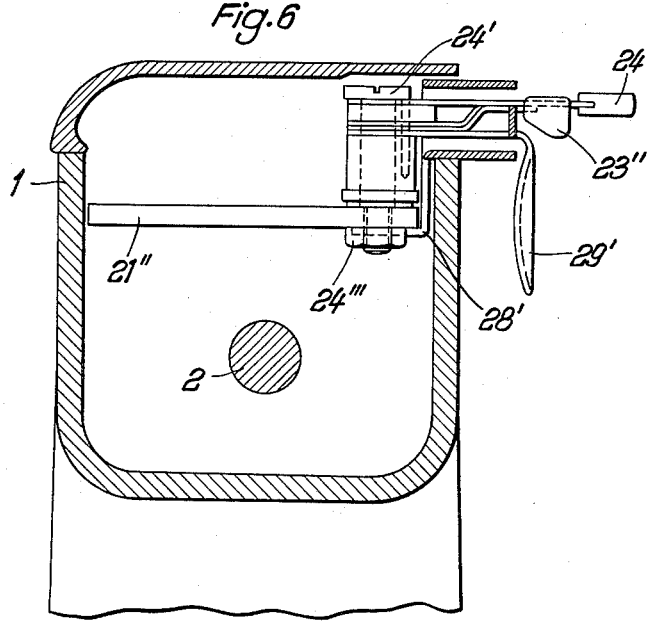
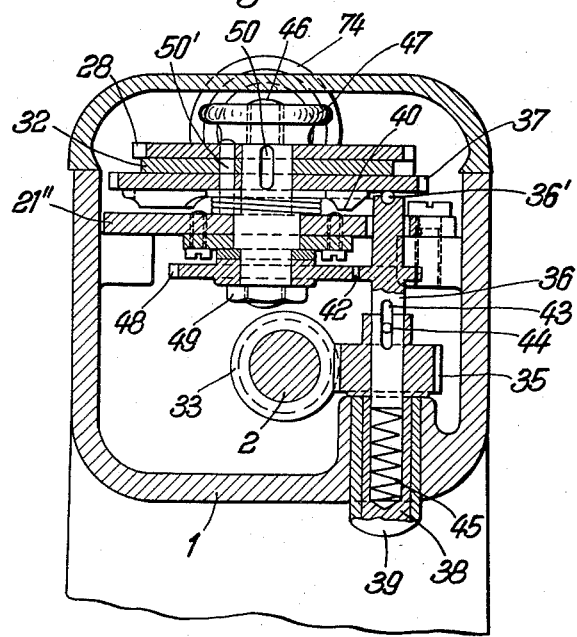

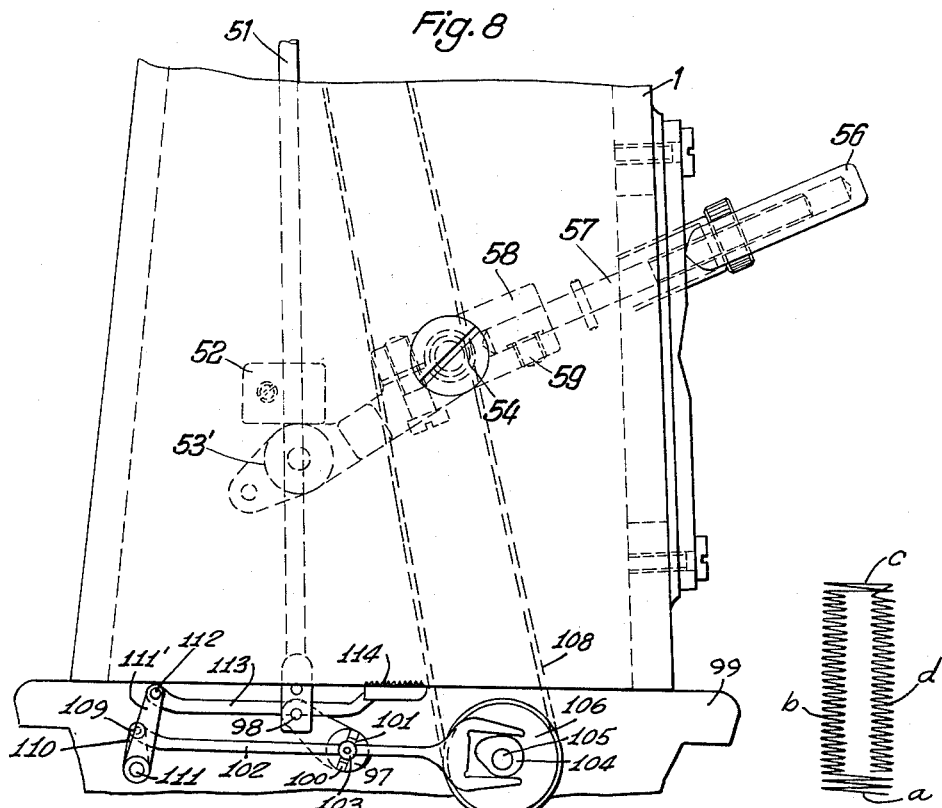
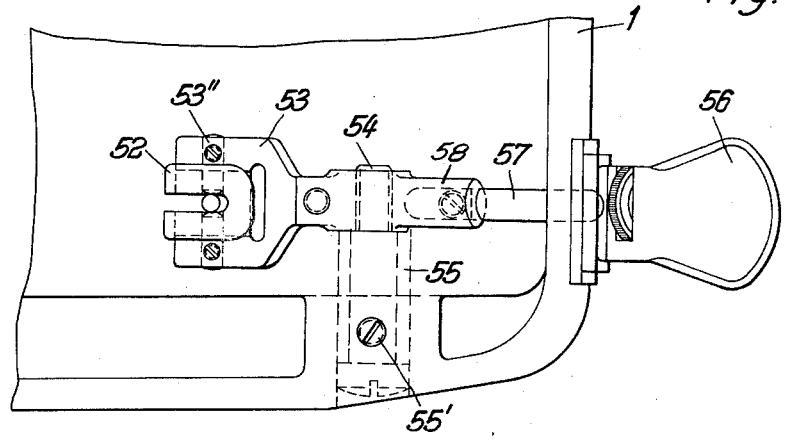

3,001,491
CONTROL MEANS FOR ZIG-ZAG SEWING MACHINE HAVING AUTOMATICALLY DISCONNECTABLE CONTROL MECHANISM
Wolfgang Engel, Bielefeld, Germany, assignor to Anker-Phoenix Nahmaschinen AG, Bielefeld, Germany
Filed Jan. 18, 1956, Ser. No. 560,011
Claims priority, application Germany Jan. 19, 1955
8 Claims. (Cl. 112—158)

The invention relates to a zig-zag sewing machine of the type where the material is fed by means of a toothed member disposed below the stitch plate. In zig-zag sewing machines of this type it is known to provide a control cam means for controlling the lateral needle deflections, the lateral centering of the needle and/or the feeding of the material.

It is an object of the invention to provide in such a zig-zag sewing machine, which is also known for household use, the possibility to produce not only a straight seam, a zig-zag seam and decorative stitches of various kinds, but also to produce button holes or other utility stitches or seams fully automatically or at least substantially so. Heretofore, special machines have been employed for the production of button holes or other utility seams, which machines are out of the question for the household, although there were some proposals for making button holes more or less automatically on household machines. However, the means used for this purpose did not permit the production of a clean button hole seam or of a clean other utility seam.

Accordingly, it is a feature of the invention that in zig-zag sewing machines of the type referred to the rotating control cam disk arrangement is provided with a cam which, in combination with a control shaft driven by the sewing machine effects an automatic cut-off of the control cam means, while the reconnecting of the drive for the control cam means is done manually by means of an externally operable manual means. The continued operation of the manual means renders the cut out cam ineffective and restores the automatic operation of the machine.

With this arrangement it is possible to sew a button hole in such a manner that in accordance with the shaping of the cam surfaces and of the control device the automatic sewing of the button holes begins with the bartack stitches at one end of the button hole. Thereupon follows the sewing of a fringe of stitches on one side of the button hole. Then the second bartack stitches are sewn and finally, while sewing the second fringe of stitches backwards, follows the automatic cut off of the control shaft, whereupon the sewing of the botton hole is completed while the control means is idle.

By means of this guiding arrangement which has the three mentioned control cam surfaces it is possible to carry out the sewing of a button hole or the like from start to finish fully automatically. However, if this is based on a predetermined length of button hole, then there is no assurance, as a result of the advancing of the material in the two oppositie directions, that for an equal number of stitches for the two adjacent fringes of the button hole sides there will result complete similarity of seams. In view of this, the invention provides the possibility of disconnecting the additional guiding or control mechanism at any given time before ending the sewing of the second fringe of stitches, whereupon the completion of the second fringe of stitches is effected exclusively by way of the conventional zig-zag arrangement.

The control cam arrangement in or upon the sewing machine can be designed to be conveniently exchangeable to provide for adaptability to the different forms of button holes, especially to different button hole lengths.

By means of this control arrangement in accordance with the invention, which cooperates with the known zig-zag mechanisms and which to that extent does not require any special structural features in a household machine, but which is inherent in a supplemental device for the known household zig-zag sewing machine, which is a special advantage, it is possible for the housewife to produce flawless button holes and other utility seams. That is because the control device acts upon all adjusting or setting devices accurately and automatically which are required to provide a cleanly sewed button hole and, where, just like with special button hole machines, the seamstress is not compelled in sewing the button hole to turn the material around the axis of the needle.

The driving of the control shaft is preferably effected from the main shaft by way of an intermediate shaft with toothed gears and the cutting off of the drive of the control shaft can take place then by axial shifting of the intermediate shaft so that the gears of the gear transmission are disengaged.

The axial shifting of the intermediate shaft cam, in addition, be effected by externally operable manual manipulating means. This provides that the seamstress can disconnect the control mechanism from the drive of the sewing machine at any desired moment while the drive of the machine proper continues to function.

The control cam arrangement is suitably designed in a manner that the feelers for the overstitch mechanism and for the needle center shifting mechanism rest against two curved surfaces disposed to have the same axis. A further feeler for the setting mechanism of the stitch setting means then rests against one cam surface at the lower front surface of the control cam mechanism.

By proceeding in this manner it is especially simple to bring this control cam mechanism into operative relationship with the known zig-zag sewing machine. It is possible to equip the known manipulating means for the setting of the overstitch with the center shifting of the needle as well as of the stitch length and stitch direction with cams, so that the moving of the cams brings the feelers in and out of operative position with respect to the cam surfaces of the control mechanism.

If all of these operating means are put into inoperative position with respect to the control cam means it is not necessary to disengage the control cam means but it is nevertheless without effect on the stitch formation. The sewing machine then operates with a straight stitch.

However, if the arrangement is made in a manner that the control surfaces present recesses in a predetermined corresponding position into which the feelers for the automatic change of movement of the needle and toothed lead or feed dog movement can enter, then it is possible with the control means disconnected to render operative by manual operation alone the zig-zag mechanism and the stitch adjustment, so that in this case the sewing machine can also be used for sewing any desired zig-zag or decorative stitches.

According to the foregoing explanation of the invention the disconnecting of the control arrangement is effected while the sewing machine drive is not disconnected. The completely automatic production of a utility seam, especially the completely automatic sewing of the button hole can also be accomplished with the said control mechanism if the entire drive of the machine is constructed to be automatically disconnectable by way of the control shaft. This can be obtained in that automatic disconnection of the entire sewing machine drive is effected by means of a further cam on the control cam device. This additional cam may, for example, operate a relay which interrupts the circuit of a magnet which is located in the driven balance wheel and thus releases the connection between the balance wheel and the main shaft in the machine arm.

The foregoing and other objects and features of the invention will become more apparent by reference to the accompanying drawings in which embodiments of the subject of the invention are illustrated and in which:

FIG. 1 is a front view of the sewing machine mechanism showing the driving components, FIG. 1a is a perspective view of the head of a sewing machine showing the needle bar, the needle bar oscillator and the toothed material advancing member, FIG. 2 is a top plan view of the machine shown in FIG. 1, FIG. 3 is another top plan view of the sewing machine in accordance with FIG. 2, showing the control cam disk means and the over stitch mechanism removed, FIG. 4 is a partial front view of the machine showing the shifting levers, FIG. 5 is a sectional view taken along the line V—V in FIG. 2, FIG. 6 is a sectional view along line VI—VI of FIG. 2, FIG. 7 is a view along line VII—VII of FIG. 2, showing particularly a section through the control cam disk means and the driving connection with the main shaft, FIG. 8 is a side view of the sewing machine showing the stitch length adjusting lever.

FIG. 9 is a partial top view of the mechanism shown in FIG. 8,

FIG. 11 shows a button hole diagrammatically as seen from the operator's side of the sewing machine.

Figure 1:
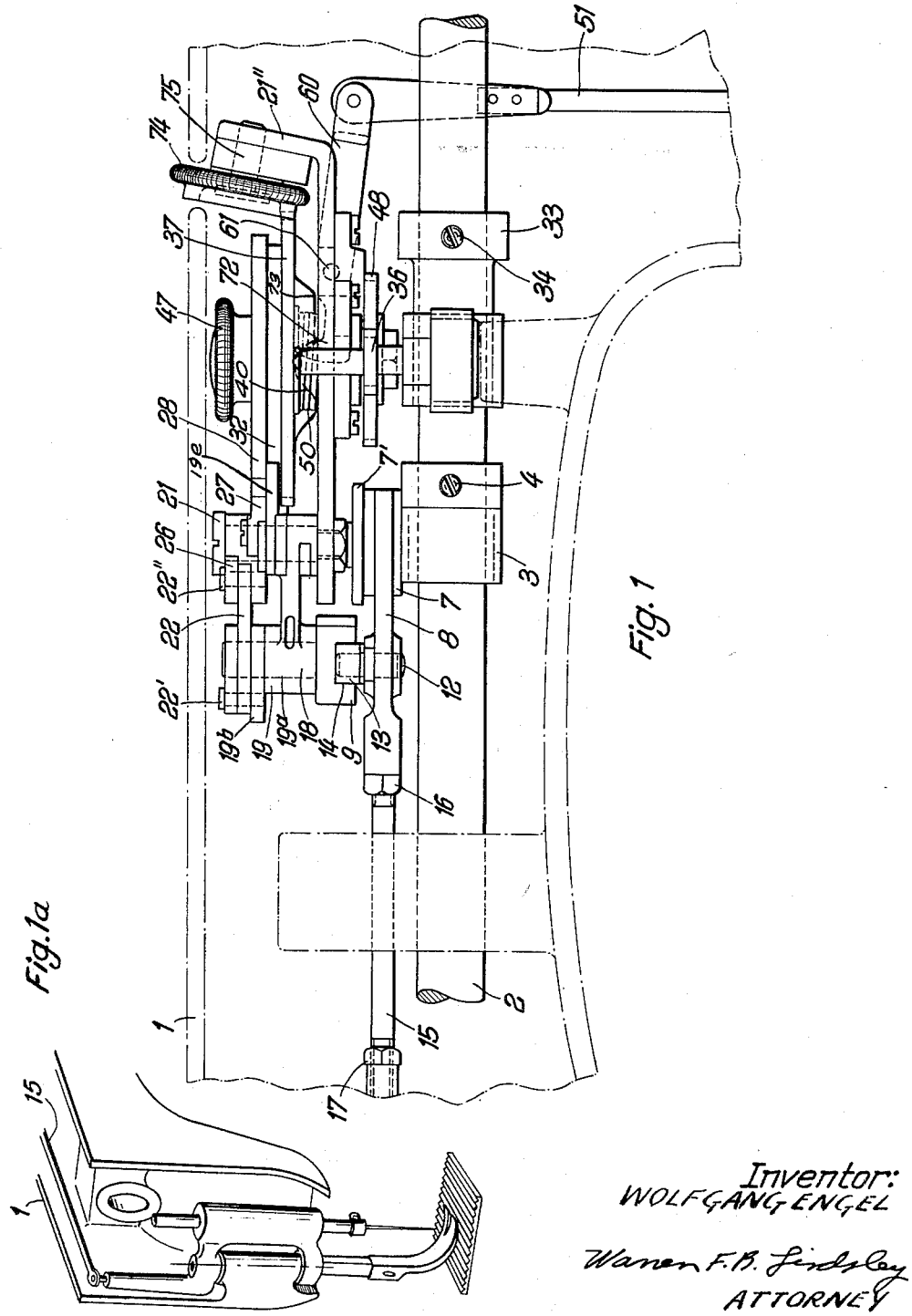

This type of button hole which the machine is adapted to produce as illustrated in FIG. 11 comprises a first group of bartack stitches a, a left hand fringe of stitches b, a second group of bartack stitches c and a right hand fringe of stitches d.

The dot and dash lines illustrate the arm 1 in which the main shaft 2 is journalled. The drive for the zig-zag sewing machine is derived from the main shaft 2. For this purpose the main shaft 2 is provided with a worm gear 3 or the like which is rigidly secured to said shaft 2 by means of a screw 4. This worm gear 3 drives another gear 5 which forms a unitary structure with the cam 7 and is rotatably mounted upon the stud 6 which is vertically disposed in housing 1 and secured thereto by means of a screw 10. The fork 8 which engages the cam 7 on two sides is connected to the needle bar oscillator (FIG. 1a) by way of push rod 15. The effective length between the needle bar oscillator and the fork 8 is set by means of nuts 16 and 17. The fork 8 rests upon the collar 8' of the worm gear 5 and is held in raised position by the cover 7' which, in turn, is held in position by means of screw 7''. By rotating the cam 7 the fork 8 is pendulated about the joint at the needle bar oscillator (FIG. 1a).

This pendulating movement of the fork 8 is translated into longitudinally reciprocating movement of rod 15 which is connected to it and which in turn acts in a known manner upon the needle bar oscillator in order to produce the lateral deflections required for zig-zag stitches. Thus the pendulating movement of the fork 8 is converted in a well known manner by means of a grooved guide or coulisse joint into the said longitudinally reciprocating motion of rod 15. The grooved guide or coulisse 9 which is journalled in a lever 19 (FIG. 1) is disposed generally obliquely with respect to the push rod 15 and may be adjusted perpendicularly or obliquely with respect to the said longitudinal direction. The sliding member 13 to which the fork 8 is connected is adapted to move in the groove 14. If the fork 8 is pendulated by the cam 7, the fork and therefore the push rod 15 is subjected by means of the sliding member to an additional component of movement longitudinally of the rod 15. This component depends on the angular position of the groove 14 of the coulisse relative to the rod 15; its magnitude depends on the magnitude of the obliqueness of the groove with respect to the longitudinal direction of the rod.

Figure 4:
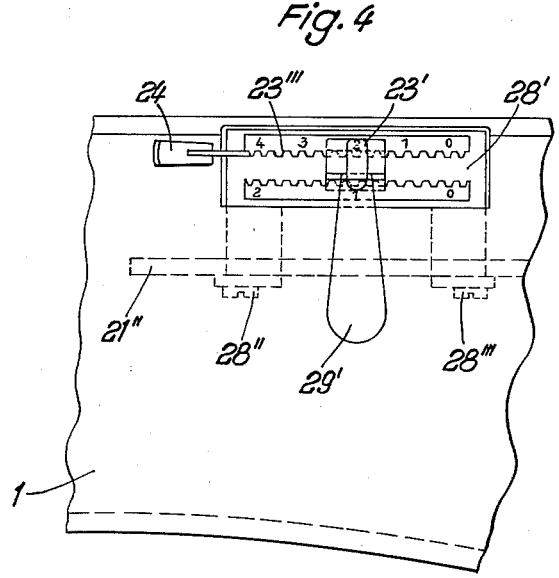
Figure 5:
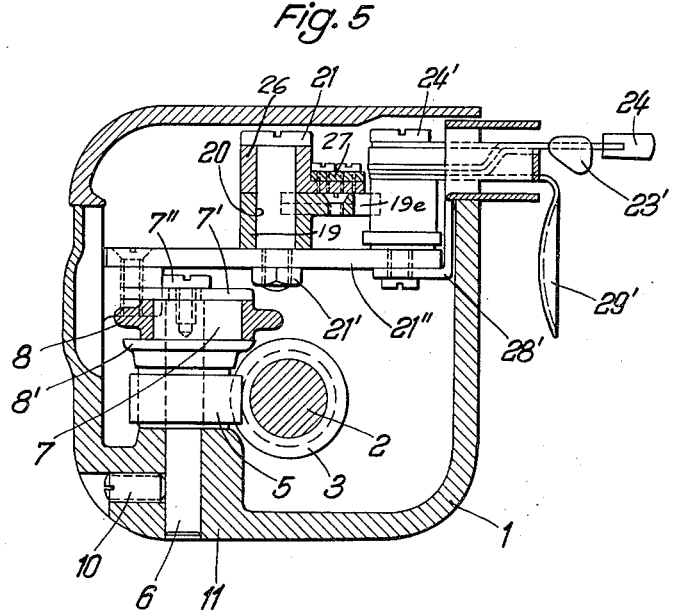

The sliding member 13 which is rotatably mounted upon the stud 12 which is securely fastened to the fork 8, slides in the groove 14 of the coulisse 9. The stud 18 of the coulisse 9 is journalled in the bore 19a of the lever 19 and carries the lever 19b. The second bore 20 of the lever 19 is rotatably supported on the bolt 21. This bolt 21 is disposed upon the carrier plate 21'' and secured thereto by means of nut 21'. The carrier plate 21'' in turn is secured to the arm 1 of the machine by means of screws 65, 66 and 67 and held in position by pins 68 and 69. The lever 26 is likewise journalled upon the bolt 21 and connected by means of strip 22 and bolts 22' and 22'' to the lever 19b secured to the stud 18 of the coulisse 9. The lever 26 is operatively connected by means of spring 23 to the cam 25 of the shifting lever 24. The lever 24 is journalled upon bolt 24' which is disposed upon the carrier plate 21'' to which it is secured by means of nut 24'''. By setting the shifting lever 24, the angular position of the groove 14 is changed and thus the magnitude of the lateral deflection of the needle. The magnitude of the lateral swing can be limited by the position of the stop levers 23' and 23''. These levers are journalled upon the bolt 24' and resiliently engage the grooves 3'' (FIGS. 4 and 6). The central position of the needle can be changed by means of the lever 29'. This lever is journalled on bolt 24' and securely engages the notches in the scale disk 28' which is fastened to the support plate 21'' by means of screws 28'' and 28'''.

Figure 3:
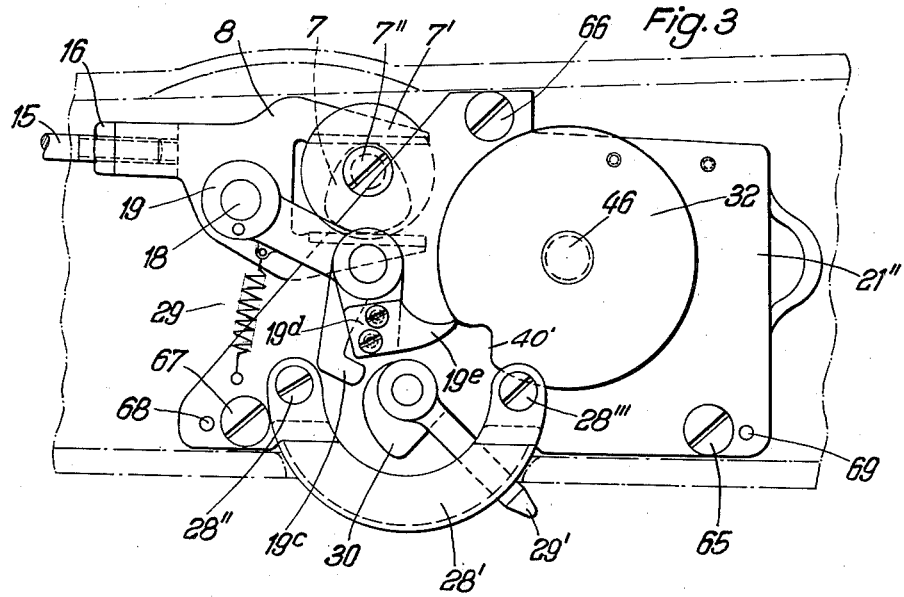

As shown in FIG. 3, the lever 19 carries the lever arm 19c and lever arm 19d to which is secured the feeler 19e. The end of the arm 19c of lever 19 operatively engages the cam 30 and lever 29'. If lever 19 is shifted by means of the switch lever 29' the coulisse 9 with its groove 14 maintains its angular position with respect to the longitudinal axis of the sewing machine by virtue of the parallelogram which is formed by the lever 19, lever 19b, strip 22 and lever 26. As a result the groove 14 by way of sliding member 13 shifts the fork 8 with the rod 15 longitudinally and thereby the center position of the needle as determined by the oblique position of the groove 14.

The stitch length and stitch direction are adjusted with the stitch lever (FIGS. 8 and 9) by means of handle 56. The stitch lever comprises the parts 57, 58 and 59. The lever 58 carries bolt 54 which is journalled in the sleeve 55 mounted in the housing arm 1 to which it is secured by screw 55'. At one end the lever 58 with its fork 53 engages the rod 51, which at its one end engages the adjusting mechanism of the advancing mechanism and at its other end the lever 60. Lever 60 is journalled by way of bolt 61 on the bracket 62 which is secured to carrier plate 21'' by screws 63 and 64. Each of the two fork prongs of lever 58 carries a pin 53'' which is engaged by a roller 53'. The thrust collar 52 which is adjustably mounted upon the draw bar 51 is operatively connected to the stitch adjusting lever by a spring (not shown) and by way of roller 53'.

The control cam disks 28, 32, 37 are mounted upon the control shaft 46 and secured against axial displacement by nut 47. A presser spring 50 on control shaft 46 carries along the cams which are held in predetermined positions with respect to one another by means of pin 50'. The control shaft 46 is rotatably mounted upon carrier plate 21'' and carries a toothed gear 48 at its projecting lower end portion, which is retained axially by nut 49. This toothed gear meshes with pinion 42 of shaft 36 which is journalled for axial displacement in the hollow shaft 38 which carries a worm gear 35. The hollow shaft 38 which has bearing support in arm 1 is provided with a pin 44 for engagement with groove 43 of the pinion shaft 36. A spring 45 presses the pinion shaft 36 against a cam surface provided below the cam disk 37 for coupling with the control shaft 46, with a ball 36' interposed therebetween. The worm gear 35 is driven by the worm gear 33 which is secured to the main shaft 2.

Figure 2:
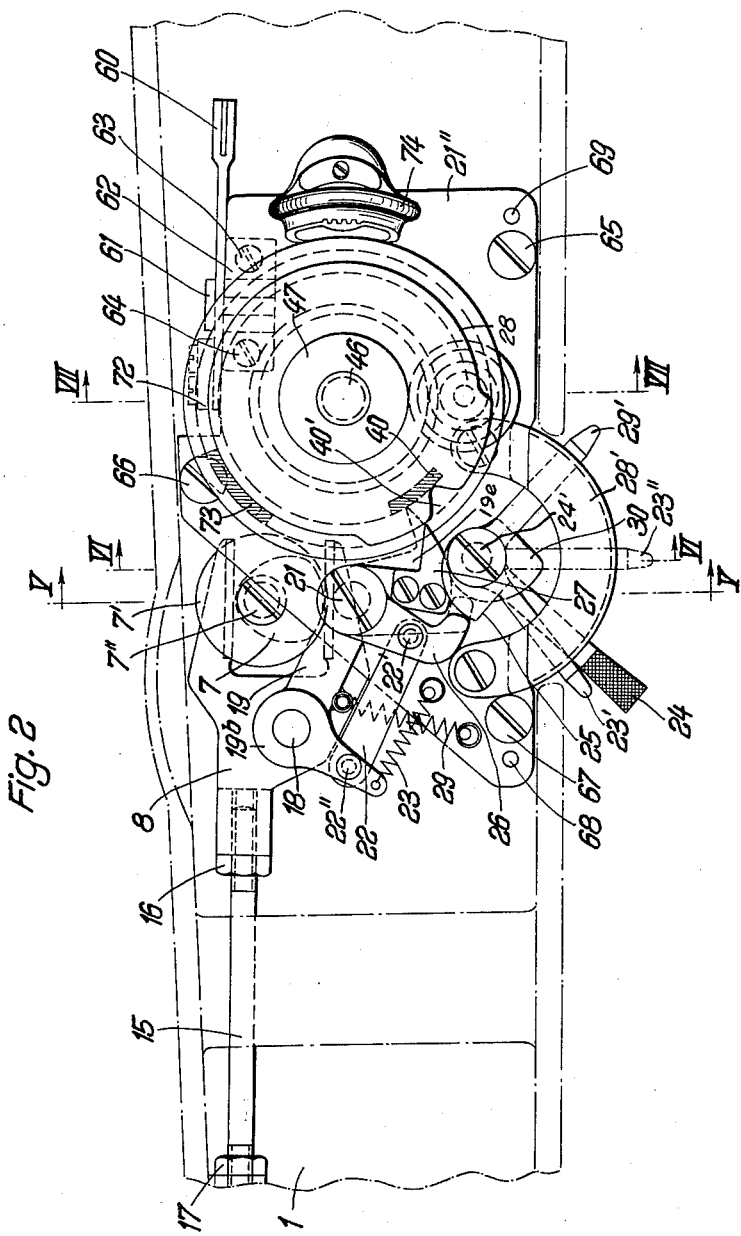

If the levers 29' and 24 are in the position designated as O in FIG. 4 and the handle 56 of the stitch adjusting lever is in the position indicated in FIGS. 8 and 9 the feeler 27 which is secured to the lever 26 is caused by the pressure of spring 23 to operatively engage the control surface of cam disk 28 (FIG. 2). Likewise the feeler 19e under pressure of spring 29 is forced against the control surface of cam 32 and under the pressure of a spring (not shown) which is secured to rod 51, the feeler 72 of lever 60 is caused to rest against the cam surface 73 provided at the bottom side of the cam disk 37. The cam disk 37 is provided with teeth circumferentially thereof which engage corresponding teeth of the gear 74. The gear 74 is journalled on bolt 75 which is secured to a turned up lobe of the carrier plate 21".

In the described position of the shifting levers 29', 24 and 56 the control surfaces of the cams 28, 32 and 37, act operatively on the needle and the toothed head or feed dog as predetermined by their shape. FIG. 1 shows follower 72 proximate the recess 40' in the cam at the underside of disk 37 behind the shaft 46, FIG. 2 indicates the position of follower 27 adjacent recess 40' in the cam disk 28, while the position of follower 19e proximate the recess 40' in disk 32 is indicated in FIG. 3. The cam 40 on disk 37 which is seen in FIGS. 2 and 7 is in such a position radially outwardly from the center as to engage shaft 36. In a desired position of the control shaft 46 the cam surface 40 of the disk 37 presses the pinion shaft 36 downwardly and thus disengages the teeth of the pinion and the teeth of the gear 48. Consequently the control shaft 46 remains in this position. With the control shaft 46 uncoupled, the shaft can be further rotated by means of wheel 74 until the recesses 40' of cams 28, 32 and 37 confront followers 27, 19e and 72. In this position of the shaft 46 the shifting levers 24, 29' and 56 are fully effective for manual operation of the zig-zag mechanism and of the advancing mechanism. If it is desired to sew automatically again the wheel 74 is turned until cam surface 40 frees the pinion shaft 36 and thus the teeth of the pinion 42 are caused by spring 45 to mesh with those of the toothed gear 48.

The draw bar 51 as shown in FIG. 8 is linked at its lower end to lever 97 by means of a bolt 98. Lever 97 which is mounted on base plate 99 is provided with a groove 100. The feed dog drive shaft 105 is likewise mounted on the base plate 99 and is driven by the main shaft 2 by way of belt 108 on pulleys 106 and 107. A cam 104 on the feed dog shaft is engaged by the jaws of forked lever 102 which is secured by means of bolt 109 to lever 110 and which has a stud 103 upon which the slide member 101 is mounted, which, in turn is in sliding engagement with the groove 100 of lever 97. Lever 100 is secured to feed shaft 111 which is journalled in base plate 99 and extends forwardly proximate the plane of the needle. A lever 111' is secured to the end of the feed shaft 111 and the material feed member 113 carrying the toothed head or dog 114 is secured by means of bolt 113 to said lever 111'.

Figure 10:
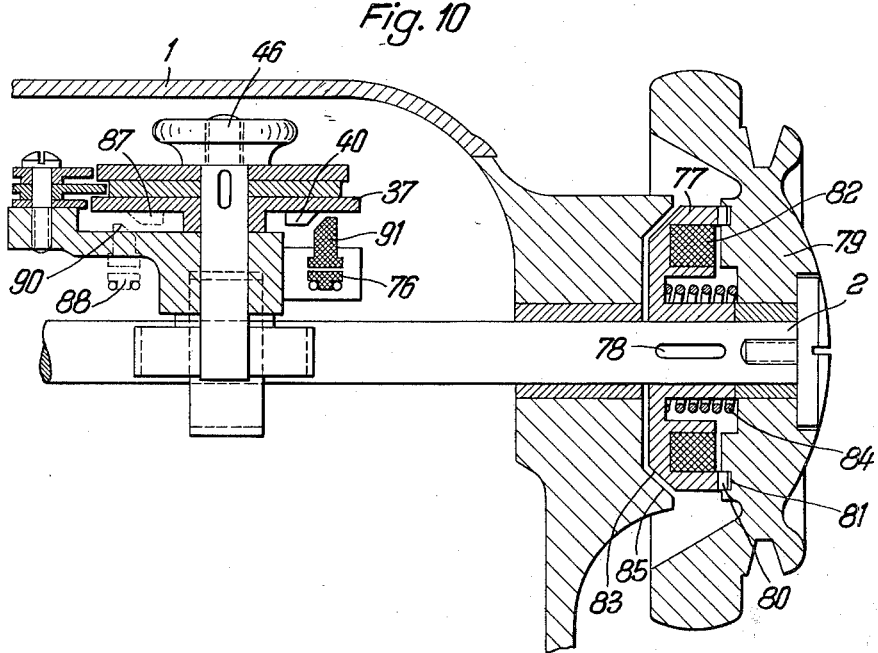
FIG. 10 illustrates a further embodiment of the manner of adjustment in accordance with FIG. 1 provided with electrical contact control means.

As illustrated in FIG. 10 the cam surface 40 can also be made to operate an electric contact switch by means of which the circuit between current source and toothed magnetic coupling 77 is interrupted and thus the connection between balance wheel 79 and the main shaft 2 is severed. The magnetic toothed coupling is slidably mounted on main shaft 2 and transfers the torsional movement to the main shaft 2 by way of key 78. Gear teeth 80 are provided at the outer perimeter of that surface of the toothed magnetic coupling 77 which faces the balance wheel 79 which runs freely upon the shaft 2. The inclined sides of these teeth engage corresponding teeth 81 of the hand or balance wheel 79 and teeth 80 and 81 transfer the torsional movement while the magnet 82 holds the teeth in engagement when the circuit is closed.

The toothed magnetic coupling 77 is provided with an outer conical surface 83 at the side facing the arm 1 of the machine which during interruption of the circuit between current supply and magnet 82 enters the recessed conical surface 85 of machine arm 1 under the pressure of spring 84 which is biased against the balance wheel thereby causing braking of the machine. The electric contact switch 76 can also be operated manually at any desired moment by means of a push button (not shown) which extends through the arm 1, an operation which may be required for threading the bobbin.

A further control cam surface 87 may be provided beneath the cam disk 37 which operates a further contact 88 by means of which a resistor is connected in or cut out of the circuit between the line and the motor (not shown). The resistance can be manually connected or disconnected at random by means of a push button (not shown) which projects from the arm 1. Shortly before interruption of the circuit between the line and magnet 82 the cam surface 87 presses the pin 90 of the contact control downwardly, thus connecting the resistor into the circuit between the line and the driving motor, causing the machine to run correspondingly slower. Turning the control shaft 46 further causes the cam surface 40 to press on the pin 90 of the contact control thus interrupting the circuit between the line and the toothed magnetic coupling 77 and bringing the machine to a standstill.

It is suitable to connect between the line and the magnet 82 a rectifier (not shown) which simultaneously converts the line potential to 24 volts. This low voltage line supplies also the illuminating circuit.

The inclination of the teeth 80 and 81 and the retaining force of the magnet 82 are proportioned in a manner that the toothed magnetic coupling 77 serves as an overload protection.

I claim:

1. In a sewing machine for zig-zag stitching of the type having a feed dog mounted below the stitch plate for feeding the material being sewed, a needle bar and a needle bar oscillator, a main drive shaft for reciprocating the needle bar, a needle bar oscillator cam, and a push rod having a forked end in engagement with said oscillator cam and extending intermediate said oscillator cam and said needle bar oscillator, control means including a cam mechanism operatively connected to said main drive shaft and including a first cam disk for controlling the lateral oscillations of the needle bar by way of said oscillator cam, a second cam disk for varying the center position of the needle bar oscillator, a third cam disk having a member movable into engagement with a level bar connected to the adjustment means for said feed dog, a control shaft supporting said first, second and third cam disk and a shaft driving gear provided on said shaft; said control means including an intermediate shaft having a pinion in engagement with said driving gear and a geared connection with said main drive shaft, and one said cam disk having a conformation operative to engage and shift said intermediate shaft for disengaging said pinion and said driving gear to automatically disconnect and render said control mechanism inoperative, and manual means operative to rotate said disks and said control shaft and disengage said conformation from said intermediate shaft, thereby restoring the connection between said pinion and said driving gear.

2. Control means for sewing macihne in accordance with claim 1, wherein said intermediate shaft is disposed parallel to said control shaft and axially movable by said conformation, and said conformation is provided on said third cam.

3. Control means in accordance with claim 1 disposed in a machine housing wherein said manual means include a handle extending from said housing.

4. Control means in accordance with claim 2 wherein said oscillator cam and said means for setting the needle bar oscillator position are provided with cam feelers or followers engaging said first and second cams circumferentially along lines parallel to the axis of said cams and operatively connected to said push rod and said third cam disk is provided at the bottom surface thereof with said conformation.

5. Control means for sewing machine in accordance with claim 1, wherein said third cam disk of said cam mechanism is provided with a further conformation operative to automatically disconnect the machine driving means.

6. In a sewing machine for zig-zag stitching of button holes having bartack stitching and fringe stitching and of the type having a feed dog mounted below the stitch plate for feeding the material being sewed comprising a feed mechanism for controlling the direction and the length of the material feed movements, a needle bar and a needle bar oscillator, a main drive shaft, a needle bar oscillator cam operatively associated with said main drive shaft and adapted to impart oscillatory movement to said needlebar, a push bar operatively connected at one end to said oscillator cam and at the other end with said needle bar oscillator, a control cam mechanism operatively connected to said main drive shaft comprising a first cam disk for controlling the lateral oscillations of said needle bar for determining the width of the bartack stitches and of the fringe stitches of button holes, a second cam disk for controlling the center position of the needle bar oscillator for sewing said fringes on the right and on the left side of the button hole, a third cam disk and linkage operatively connecting said third cam disk to said feed mechanism for controlling the forward stitches for one fringe and the backward stitches for the other fringe of a button hole by changing the direction of feed, and a cam control shaft operatively connected to said main drive shaft and carrying said first, said second and said third cam disks, a shaft disengaging cam conformation on one of said cam disks, a movable uncoupling member disposed in the path of movement of said cam conformation and adapted to be engaged thereby to automatically disengage said control cam mechanism from said main drive shaft in a predetermined position of said control shaft in which said first cam disk has set said needle bar oscillator to the width of the fringe of the button hole and prior to arrival in the position where said first cam disk changes the needle bar oscillations to the bartack stitch width.

7. In a sewing machine in accordance with claim 6 a manipulating member connected with said control cam mechanism operative to shift said control mechanism to the starting position for button hole stitching and to reestablish the connection between the main drive shaft and the cam control shaft.

8. In a sewing machine for zig-zag stitching of button holes having bartack stitching and fringe stitching and of the type having a feed dog mounted below the stitch plate for feeding the material being sewed comprising a feed mechanism for controlling the direction and the length of the material feed movement, a needle bar and a needle bar oscillator, a main drive shaft, a needle bar oscillator cam operatively associated with said main drive shaft and adapted to impart oscillatory movement to said needle bar, a push bar operatively connected at one end to said oscillator cam and at the other end with said needle bar oscillator, a control cam mechanism comprising a first cam disk for controlling the lateral oscillations of said needle bar for determining the width of the bartack stitches and of the fringe stitches of button holes, a second cam disk for controlling the center position of the needle bar oscillator for sewing said fringe stitches on the right and on the left side of the button hole, a third cam disk and linkage operatively connecting said third cam disk to said feed mechanism for controlling the forward stitches and the backward stitches of a button hole, cam driving means operatively connected to said main drive shaft to rotate said cam disks, disconnect means operative to disconnect said cam driving means and a manipulating member connected with said first, said second and said third cam disk operative to shift said cams from the last position for buttonhole stitching of one button hole to the starting position for button hole stitching of the next button hole.

References Cited in the file of this patent

UNITED STATES PATENTS

| | | |
|---|---|---|
| 592,510 | Parkes | Oct. 26, 1897 |
| 1,611,372 | Rader | Dec. 21, 1926 |
| 1,675,508 | Muller | July 3, 1928 |
| 2,121,884 | Prazak | June 28, 1938 |
| 2,653,557 | Casas-Robert et al. | Sept. 29, 1953 |
| 2,755,754 | Urscheler | July 24, 1956 |